Patented May 1, 1928.

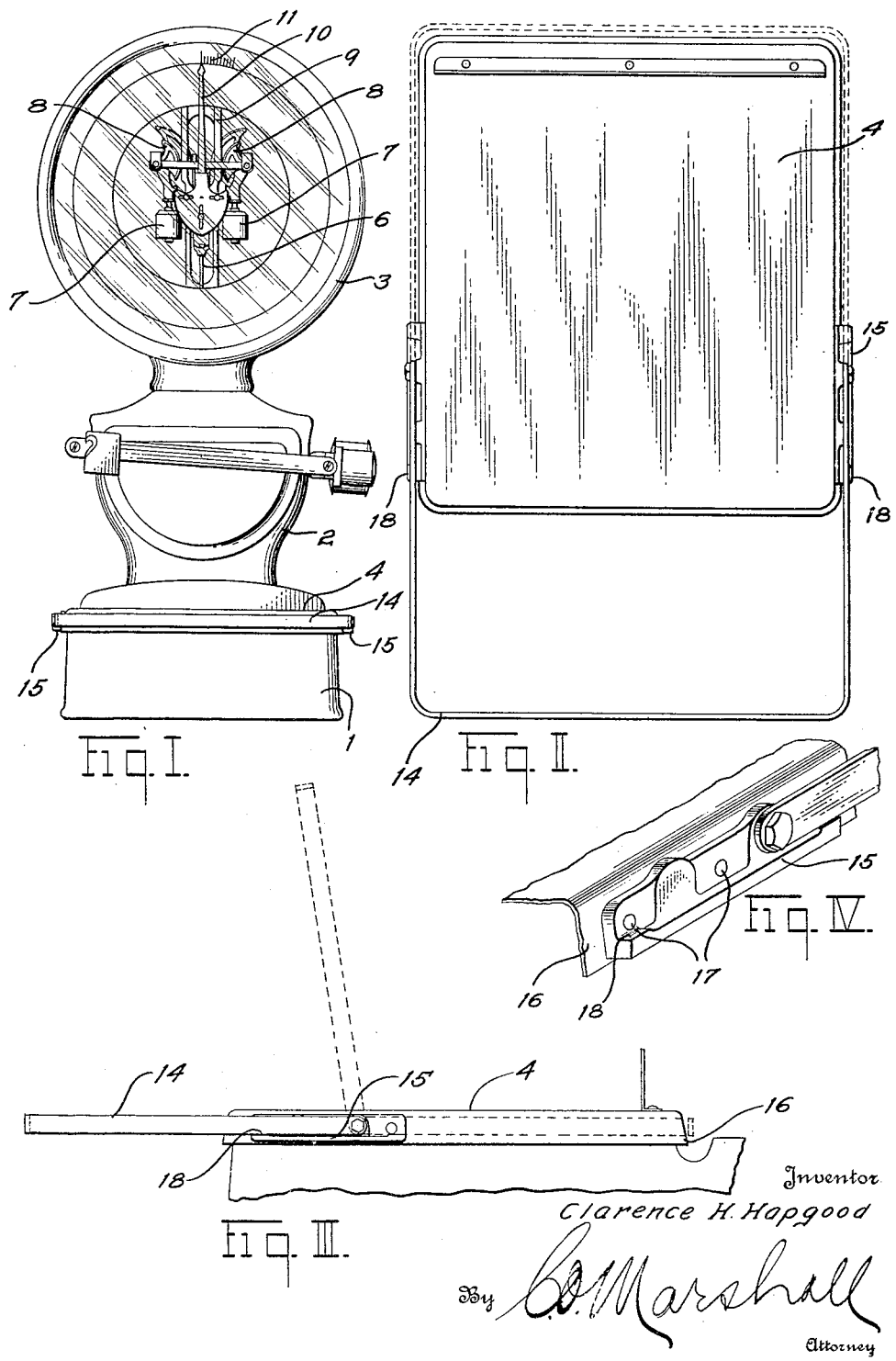

1,667,891

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 4, 1925. Serial No. 6,865.

This invention relates to weighing scales, and more particularly to extension devices for use with the commodity-receiving member or platform of the scale.

One of the principal objects of the invention is the provision of an extension device for use in conjunction with the usual load-receiving platform to assist in supporting loads of unwieldy proportions which may not practicably be supported upon the scale platform per se.

Another object of the invention is the provision of an extension member for a weighing scale platform to assist in supporting the load on the scale platform, the extension member being entirely supported by said platform and forming a normal part of the initial load upon the platform supporting levers.

A further object is to provide a type of extension load supporting member for a scale platform which may when not in use be swung to a position normally out of the way of the operator and adjacent the periphery of the platform so as to be inconspicuous.

Still another object is the provision of an extension member for a scale platform which is inexpensive to manufacture and of a type capable of being affixed to any platform without the use of special tools.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale of a well known type embodying my invention;

Figure II is an enlarged top plan view of the scale platform showing the extension device of my invention in extended position;

Figure III is a side elevational view of the parts shown in Figure II; and

Figure IV is an enlarged isometric perspective view showing the means for securing the extension device to the platform.

Referring to the drawings in detail, I have shown the device of my invention as incorporated in a scale of the counter type, and as my invention forms no part of the weighing mechanism per se I will only describe it in such detail as to show the application of my invention thereto.

The scale consists of a base 1 upon one end of which is erected a column 2 surmounted by a substantially watch-case-shaped housing 3. Supported within the base 1 is a system of levers (not shown) adapted to support a commodity-receiving platform 4, the levers being suitably connected by means of a rod 6 to a pair of load-counterbalancing pendulums 7. The pendulums are provided with sectors 8 which are suitably suspended from a frame 9 by means of flexible metallic ribbons (not shown). When a load is placed upon the platform 4 a downward pressure is exerted upon the rod 6, causing the pendulums to swing outwardly and upwardly to counterbalance the load, the pendulums also actuating an indicator hand 10 by means of rack and pinion mechanism (not shown) to swing over a dial 11 to indicate the weight of the load on the platform. This type of weighing mechanism is more particularly described and claimed in my Patent No. 1,213,611, dated November 7, 1916.

It is a usual occurrence in business establishments, hardware houses, packing companies, etc., that commodities or articles must be weighed which are of such unwieldy and bulky proportions that the ordinary load-receiving platform of a scale is not adapted to accommodate such articles. To obviate such difficulty I have provided a supplemental load support in the form of a U-shaped extension member 14, the extremities of the member 14 being pivoted to brackets 15 which are fixed to the downwardly turned flanges 16 of the platform 4 by means of rivets 17. It will be apparent that the extension member 14 when swung to the position indicated in full lines in Figures II and III is supported upon raised bosses 18 forming integral parts of the brackets 15 and in this position forms a supplemental load support to assist in supporting loads of bulky and unwieldy proportions, such, for example, as coils of wire, rope, barrels, boxes and numerous other articles.

When it is desired to dispense with the use of such supplemental load support it may be swung about its pivots to a stored or out-of-the-way position, as indicated by the dotted lines in Figures II and III. It will be apparent that the member 14 in this position will not hamper the weighing of ordinary articles.

The position of the member 14 will have no effect whatever on the weighing accuracy of the scale, as the weight of such member forms part of the initial load upon the platform lever mechanism. As the device is simple in construction, it does not require any special skill to install the device and may be used in conjunction with any platform where its use may be found desirable.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including a load-receiving platform and an indicator, and a supplemental load support pivotally adjustable with respect to said platform from a stored position to a position of use extending from said load-receiving platform on the side opposite said indicator.

2. In a device of the class described, in combination, weighing mechanism including a load-receiving platform, a supplemental load support pivotally secured to said platform, said supplemental load support being normally in a stored position adjacent the periphery of said platform, and means including a stop whereby said supplemental load support may be extended to a projecting position of use.

3. In a device of the class described, in combination, lever mechanism, a load-receiving platform supported upon said lever mechanism, and a U-shaped member pivotally secured to said platform adapted to be swung to an extended position to assist in supporting the load upon the platform and means for holding said U-shaped member in extended position.

4. In a device of the class described, in combination, weighing mechanism including lever mechanism, a load-receiving platform supported by said lever mechanism, a U-shaped member pivotally secured to said platform and normally in an inactive position in juxtaposition to the periphery of the platform, said member adapted to be swung to a position to assist in supporting a load upon the platform and means for holding said U-shaped member in extended position.

5. In a device of the class described, in combination, weighing mechanism including a load-receiving platform, a pair of brackets fixed to said platform, and a U-shaped member pivotally secured to said brackets, said member adapted to be swung to a position extending outwardly from the platform to assist in supporting the platform load and means for holding said U-shaped member in extended position.

6. In a device of the class described, in combination, weighing mechanism including a load-receiving platform, a pair of brackets fixed to either side of the platform, and a U-shaped extension member having its extremities pivotally secured to said brackets, said member adapted to be swung from a stored position to an outwardly projecting position to assist in supporting the platform load and means on said bracket to hold said U-shaped member in projecting position.

CLARENCE H. HAPGOOD.